(12) United States Patent
Melic (10) Patent No.: US 8,240,632 B2
(45) Date of Patent: Aug. 14, 2012

(54) BEAM CLAMP

(76) Inventor: Jonathan J. Melic, Stoney Creek (CA)

( * ) Notice: Subject to any disclaimer, the term of this patent is extended or adjusted under 35 U.S.C. 154(b) by 0 days.

(21) Appl. No.: 12/906,659

(22) Filed: Oct. 18, 2010

(65) Prior Publication Data

US 2012/0091309 A1    Apr. 19, 2012

(51) Int. Cl.
*F16M 13/00*    (2006.01)
(52) U.S. Cl. .............. 248/542; 248/228.1; 248/228.3
(58) Field of Classification Search .......... 248/542, 248/228.1, 228.2, 228.3, 222.11, 229.23, 248/72; 183/113
See application file for complete search history.

(56) References Cited

U.S. PATENT DOCUMENTS

| | | | | |
|---|---|---|---|---|
| 2,605,074 A * | 7/1952 | Bucsko et al. | ............... | 248/235 |
| 2,868,485 A * | 1/1959 | Friel | ................ | 248/59 |
| 2,875,969 A * | 3/1959 | Thompson | ............... | 248/72 |
| 4,550,890 A * | 11/1985 | Redman et al. | ............... | 248/59 |
| 5,146,724 A * | 9/1992 | Angelo | ............... | 52/299 |
| 5,711,397 A * | 1/1998 | Flora et al. | ............... | 182/3 |
| 5,897,088 A * | 4/1999 | Kirschner | ............... | 248/300 |
| 7,111,707 B2 * | 9/2006 | Reeves | ............... | 182/36 |
| 2003/0218111 A1 * | 11/2003 | Labeirie et al. | ........... | 248/228.1 |
| 2005/0045785 A1 * | 3/2005 | Cohen | ............... | 248/214 |
| 2005/0189456 A1 * | 9/2005 | Hoffmann | ........... | 248/228.1 |

OTHER PUBLICATIONS

Miller (by Sperian), New Miller Epic Barrier Systems, Edge Protection for Improving Compliance, Company brochure, Unknown Date.

* cited by examiner

*Primary Examiner* — Ramon Ramirez
(74) *Attorney, Agent, or Firm* — Emerson Thomson Bennett; Roger D. Emerson

(57) ABSTRACT

A beam clamp releasably securable to a flange of a beam. The beam clamp comprises a clamping member connected to a base. The clamping member includes a latch. The latch has an engaged and a disengaged position. When in its engaged position the latch securing the clamping member to the flange and thereby securing the base to the beam. When it is in its disengaged position the latch permitting the base to be removed or withdrawn from the beam.

15 Claims, 10 Drawing Sheets

BEAM CLAMP

FIELD

This invention relates generally to beam clamps, and in one particular embodiment to a beam clamp that may be releasably secured to an "I" or "H" beam as are commonly used in the construction industry.

BACKGROUND

Steel beams, or girders as they are sometime referred to, are commonly used in the construction industry as primary and secondary load bearing structures. Probably one of the most commonly used beams is the "I" beam. I-beams are named after the shape of their cross-sectional profile, which is comprised of an upper and lower flange connected by a generally perpendicular web.

The construction of both residential and commercial buildings often requires that temporary barriers be erected at the building perimeter or in areas where workers could be exposed to the dangers of falling. Such barriers must ensure the safety of persons working at the construction site and are designed so that they are easy to install and also easy to remove to allow them to be used at other locations or on other job sites. Currently, barrier systems that are used in instances where I-beams or similar structures are present tend to be either single use products or, where they can be installed and then removed for further use, tend to be difficult for workers to safely install on a beam that in many cases can be situated several stories in the air. In some instances installation of the barriers requires the assistance of multiple personal, while in other situations it may be necessary to drill holes into the beam or surrounding structures in order to safely mount the barrier system. It is often difficult for workers to know when a barrier system has been adequately and properly secured to a rigid structure and that an area is secure and safe.

SUMMARY

The invention therefore provides a beam clamp that can quickly and easily be releasably secured to a beam by a single worker. The beam clamp provides a means to securely and safely clamp a structure to a beam, where that structure may then subsequently be used to support safety barriers and the like. The beam clamp of the present invention also in one embodiment provides a visual indicator that signals when the clamp has been properly positioned.

Accordingly, in one of its aspects the invention provides a beam clamp releasably securable to a flange of a beam, the beam clamp comprising a clamping member connected to a base, the clamping member including a latch, the latch having an engaged and a disengaged position, when in the engaged position the latch securing the clamping member to the flange and thereby securing the base to the beam, when in the disengaged position the latch permitting the base to be removed or withdrawn from the beam.

In a further aspect the invention provides a beam clamp releasably securable to a flange of a beam, the beam clamp comprising a first clamping member releasably securable to a first side of the flange; a second clamping member releasably securable to a second side of the flange, the first and second sides of the flange being on opposite sides of the web of the beam; a base connecting the first and second clamping members, when the first and second clamping members are secured to the flange the base secured to the beam; at least one of the first and the second clamping members including a latch associated therewith, the latch having an engaged and a disengaged position, when in the engaged position the latch securing the clamping member associated therewith to one side of the flange of the beam.

Further aspects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show various embodiments of the present invention which.

DETAILED DESCRIPTION

The present invention may be embodied in a number of different forms.

However, the specification and drawings that follow describe and disclose only some of the specific forms of the invention and are not intended to limit the scope of the invention as defined in the claims that follow herein.

Figure 1:
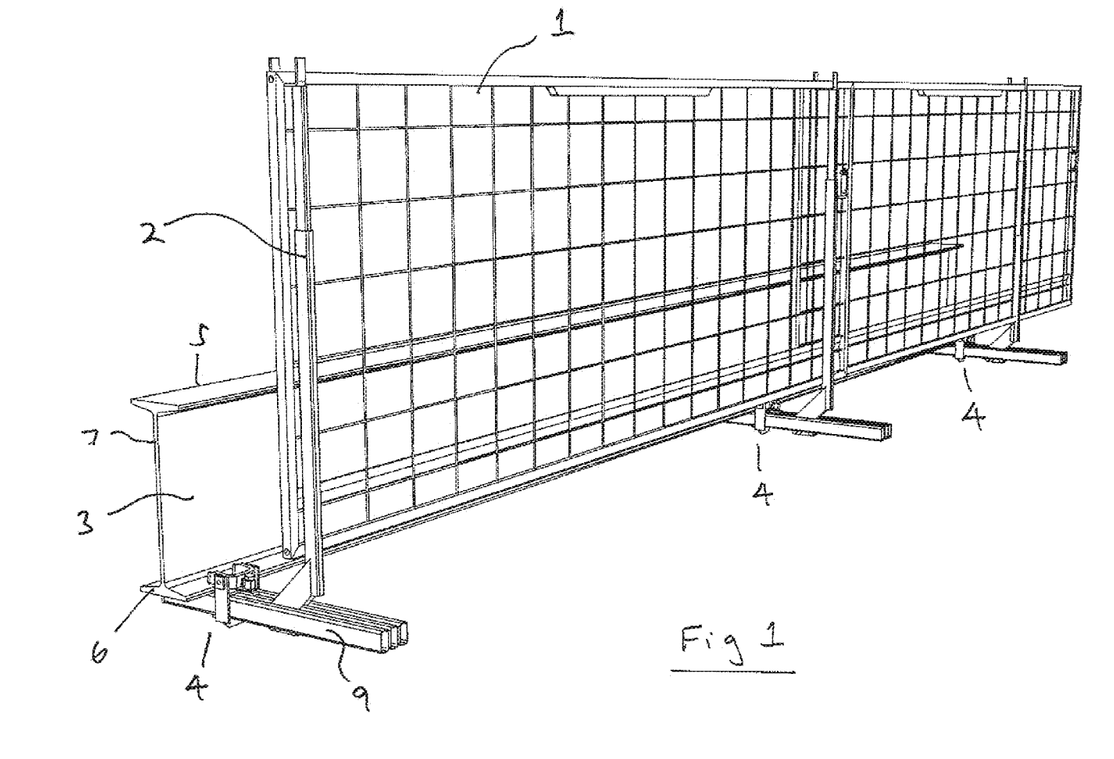
FIG. 1 is a side perspective view of a beam having attached thereto an embodiment of the beam clamp of the present invention shown supporting a typical barrier system.
Figure 2:
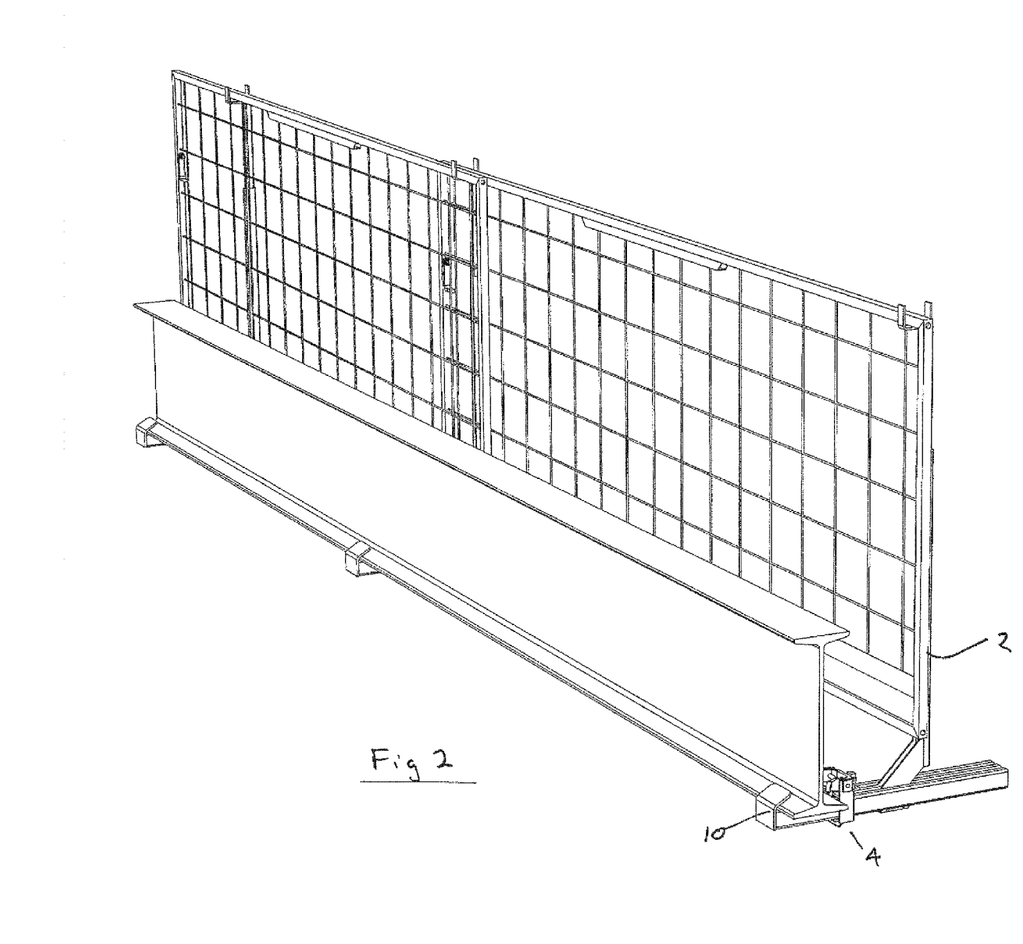
FIG. 2 is an opposite side perspective view to that shown in FIG. 1.

With reference to FIGS. 1 & 2, there is shown a typical barrier system that can be supported using the beam clamp of the present invention. The barrier system shown comprises, generally, a barrier fence 1 supported by (in this instance) a pair of posts 2 that are secured to a beam 3 through the use of a beam clamp 4 constructed in accordance with one of the embodiments of the invention. Beam 3 in this embodiment is a typical I-beam comprised of an upper flange 5, a lower flange 6 and a connecting web 7. In FIG. 1 beam clamp 4 is releasably secured to the lower flange 6 of the beam.

Figure 3:
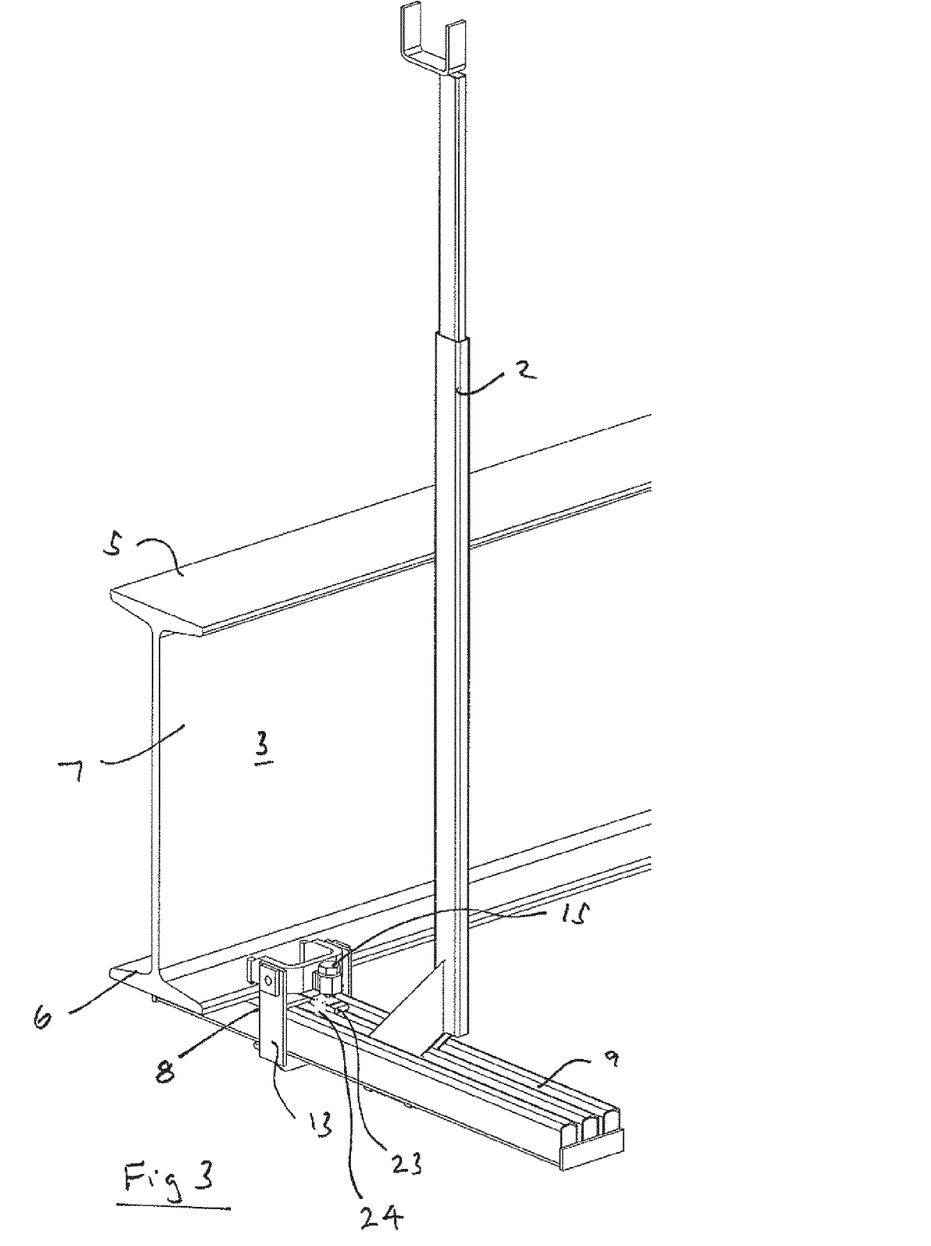
FIG. 3 is a side perspective view of one of the embodiments of the beam clamp of the present invention shown releaseably secured to a beam.
Figure 4:
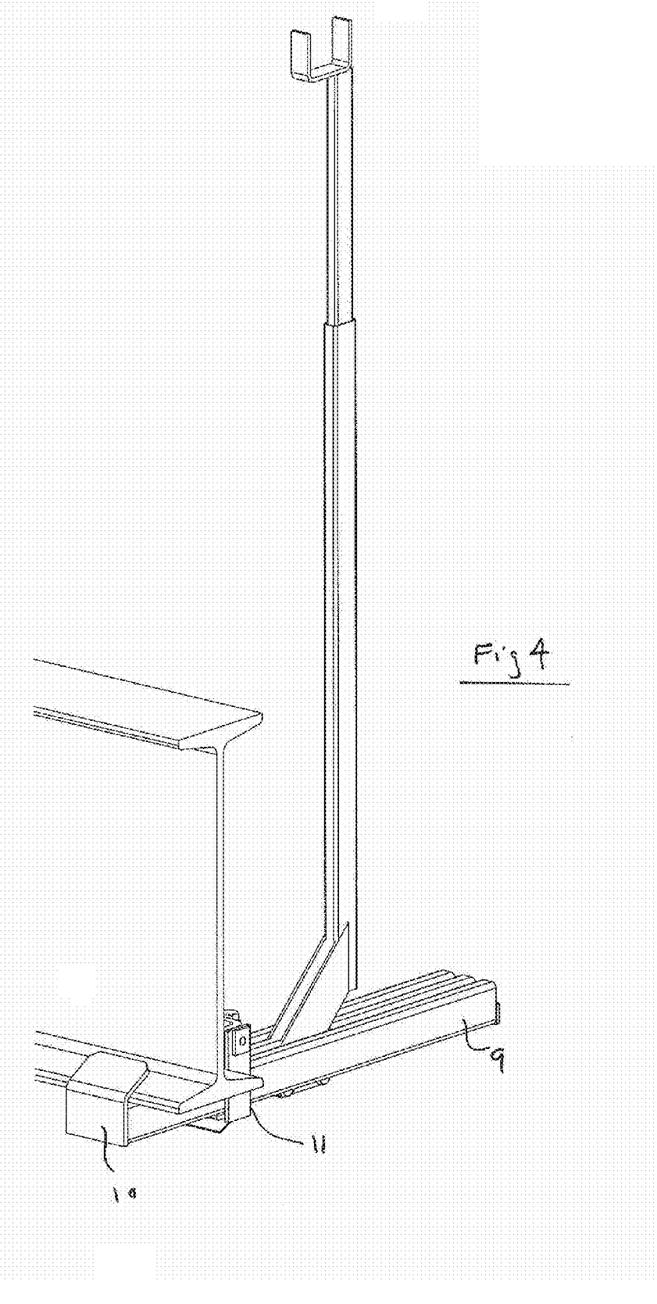
FIG. 4 is an opposite side perspective view to that shown in FIG. 3.
Figure 5:
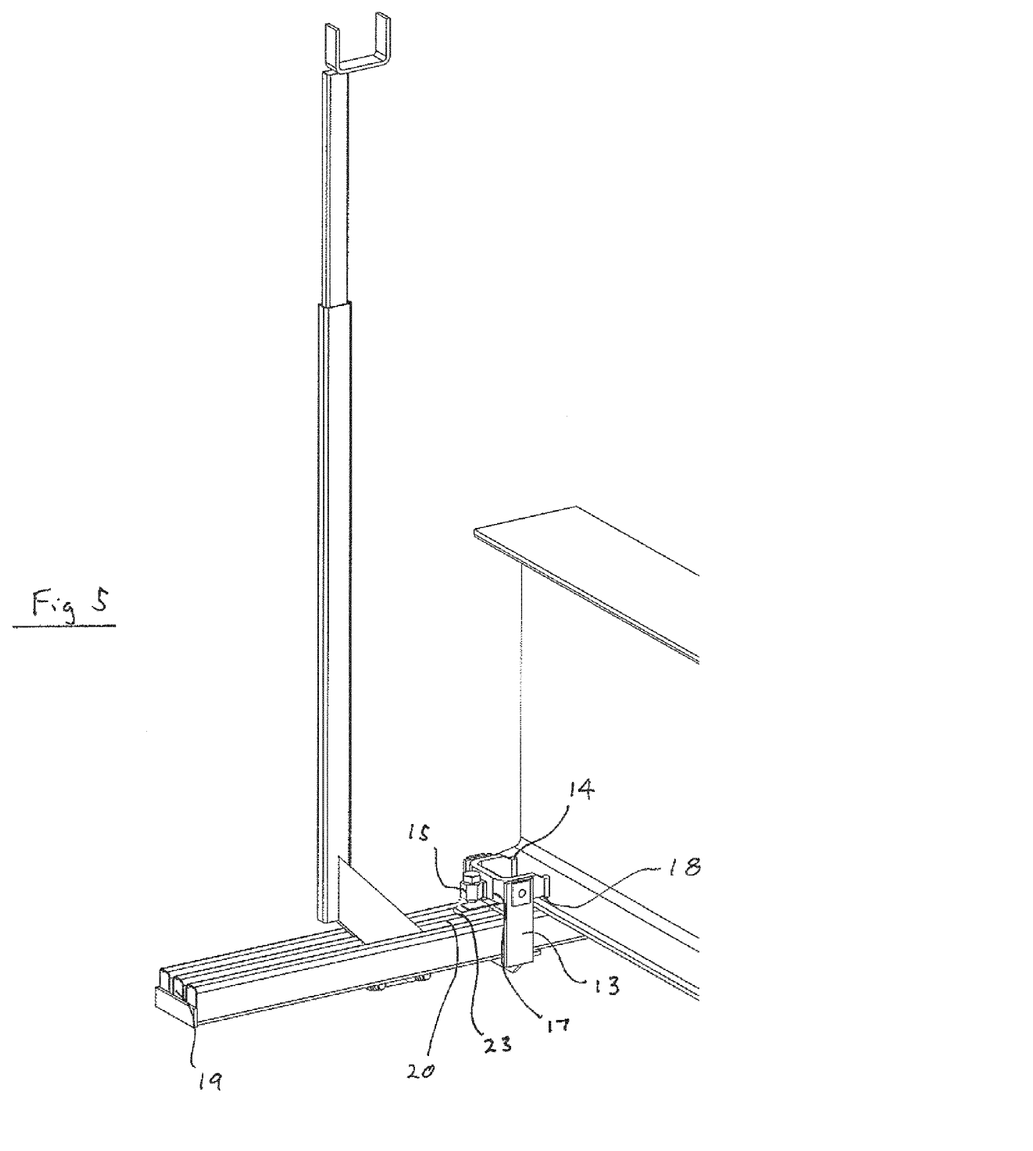
FIG. 5 is a further side perspective view of a beam clamp in accordance with one of the embodiments of the present invention shown attached to a beam.

With reference to FIGS. 3 through 5, beam clamp 4 is comprised generally of a clamping member 8 connected to a base 9. In this particular example base 9 is constructed from three elongate tubes or rails positioned in a generally parallel configuration. In alternate embodiments of the invention base 9 could be constructed in any one of a wide variety of different forms, including but not limited to; different tubular structures or using tubes or rails of different profiles and configurations; in the form of a solid plate; in the form of a beam; etc. In the attached drawings beam clamp 4 is shown as including two clamping members; namely, a first clamping member 10 and a second clamping member 11. It will, however, be appreciated that in alternate embodiments it would be possible to utilize only second clamping member 11.

Figures 6, 7:
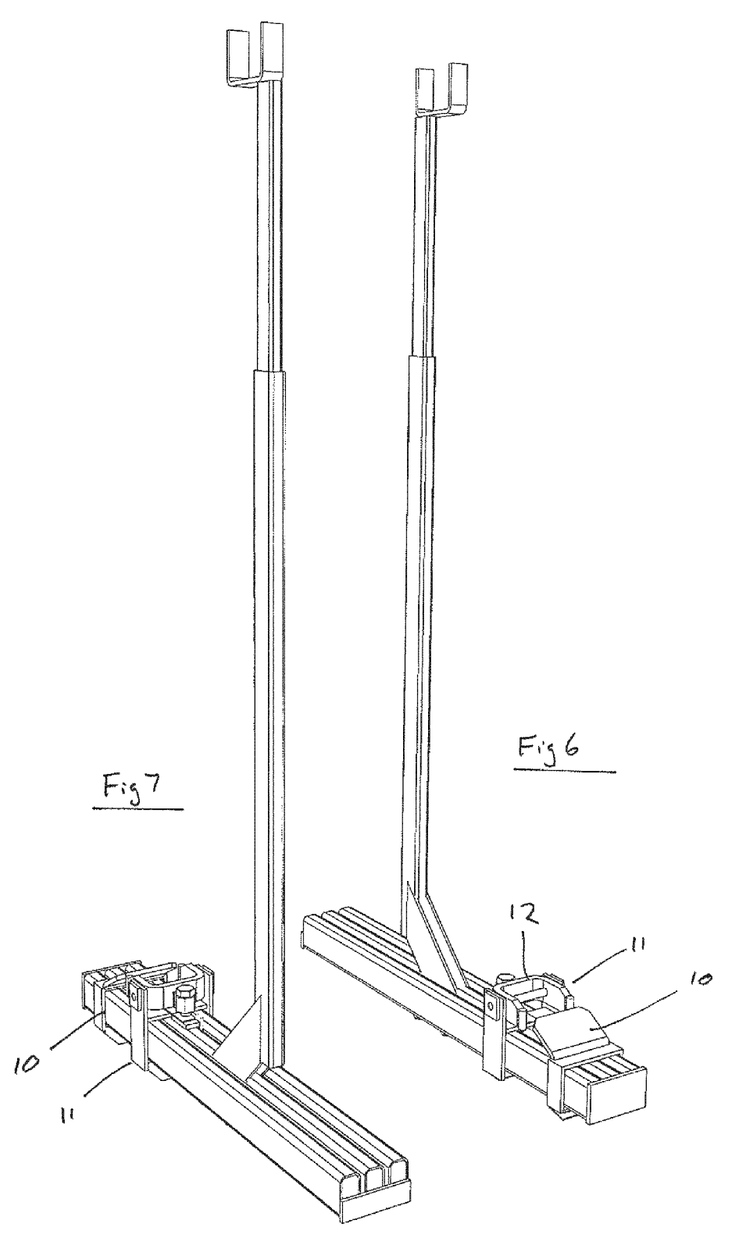
FIG. 6 is a side perspective view of a beam clamp constructed in accordance with a further embodiment of the invention.
FIG. 7 is a side perspective view opposite to that shown in FIG. 6.
Figure 8:
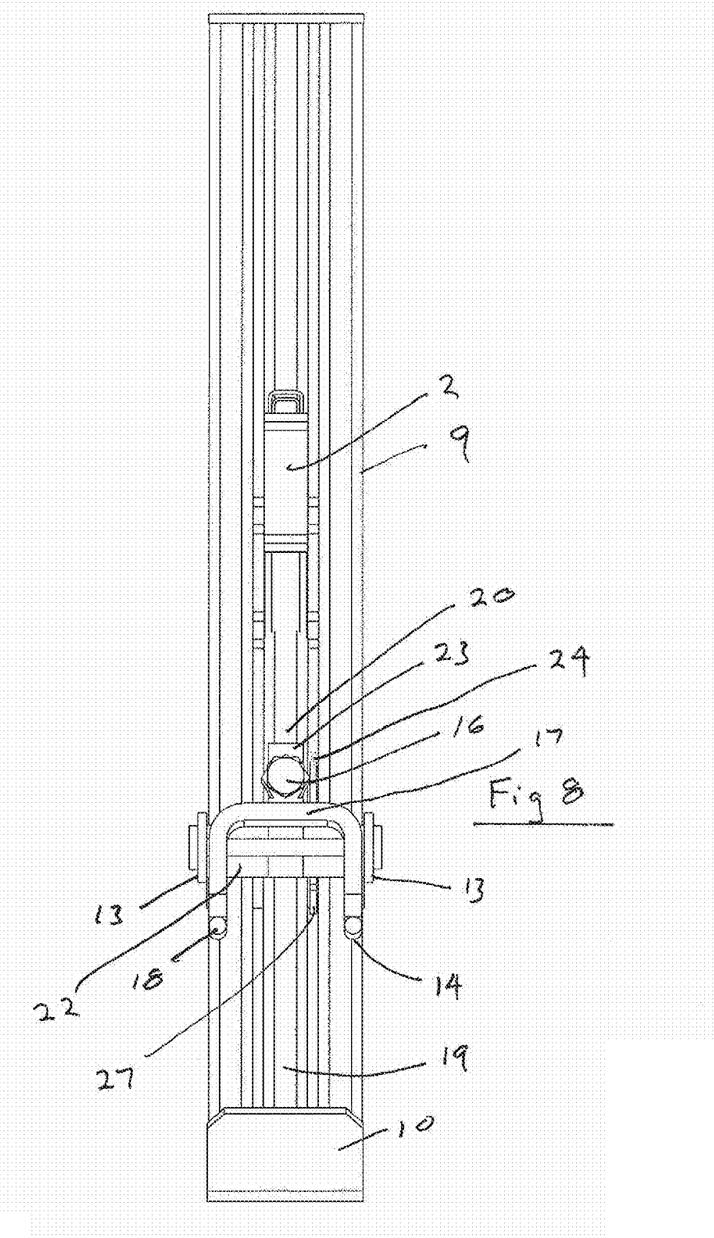
FIG. 8 is a plan view of the beam clamp shown in FIG. 3 without reference to the beam.
Figure 9:
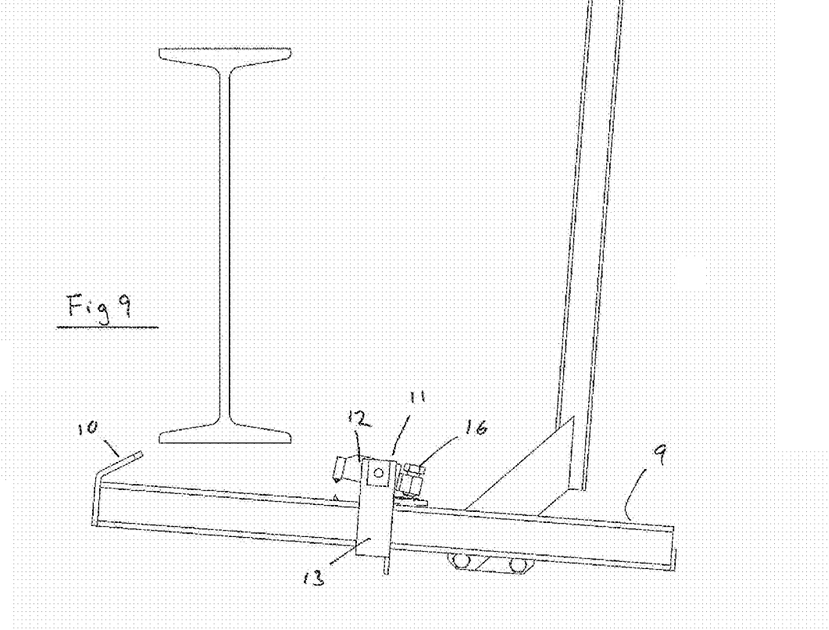
FIG. 9 is a side elevational view of the beam clamp with its latch in a disengaged position and shown immediately prior to engagement with the beam.

Beam clamp 4 further includes a latch 12 that has an engaged and a disengaged position. When latch 12 is engaged it releasably secures the clamping member with which it is associated to the lower flange of beam 3 (see FIGS. 3 through 5). When the latch is disengaged the base is permitted to be removed or withdrawn from the beam. In the embodiment where two clamping member are utilized, the clamping members are releasably engaged with the beam's flange on opposite side of web 7. In this embodiment, at least one of the first and second clamping members be slidably receivable upon base 9 to allow beam clamp 4 to accommodate beams of different sizes having flanges of different widths. It will be understood that the manner in which the clamping member or clamping members may be slidably received upon base 9 could vary between a relatively large number of different mechanical structures. In some instances the clamping member may be slide along the length of base 9 and be held in position by frictional engagement, whereas in other instances bolts or other fastening mechanisms may be used to securely hold the clamping member in place on the base once it has been moved into its desired position. In the embodiment of the invention shown in FIGS. 1 through 5, first clamping member 10 is rigidly fixed to base 9 and second clamping member 11 is slidably received on the base. It the embodiment shown in FIGS. 6 and 7 both of first and second clamping members 10 and 11 are slidably received on base 9.

In one embodiment latch 12 is pivotally mounted upon a pair of generally upright arms 13 such that the inner ends 14 of latch 12 bear against the upper surface of one side of lower flange 6 of beam 3 when the latch is in its engaged position. A pair of generally horizontal plates 21 and 22, respectively, connect arms 13 at points above and below base 9 to secure the arms to the base and to permit them to be slid along its length. Latch 12 also includes a lock 15 to retain the latch in its engaged position and to prevent the clamping member from unintentionally becoming disengaged from the beam. Lock 15 may comprise a bolt 16 that is threaded through an outer end 17 of latch 12 with the lower end of the bolt bearing against a rearwardly projecting plate 23 of second clamping member 11, which in turn may be in contact with the upper surface of base 9. In this manner it will be appreciated that tightening the bolt will have the tendency of attempting to further pivotally rotate the latch about arms 13, thereby urging the latch toward its engaged position. In general, the more that bolt 16 is tightened, the more force applied to latch 12 and the more securely that base 9 is held to beam 3.

In one embodiment of the invention beam clamp 4 may include a biasing member for urging latch 12 toward its engaged position. The biasing member may be comprised of one or more springs to help to hold the latch in its engaged position. The springs may be used in conjunction with, or in place of, bolt 16. Where springs are used in conjunction with bolt 16, the springs will serve to act as a preliminary means to hold the latch in its engaged position until such time as bolt 16 can be tightened to more permanently lock the latch in its engaged configuration.

To further enhance the ability of beam clamp 4 to be securely engaged with the flange of beam 3, the inner ends 14 of latch 12 may include one or more downwardly depending pins 18 that contact the upper surface of lower flange 6 when the latch is in its engaged position. In one embodiment pins 18 are pointed and made from a hardened material such that as bolt 16 is tightened and latch 12 pivotally rotated about arms 13, the ends of the pins will be driven into contact with the upper surface of the flange, thereby enhancing both the frictional and mechanical contact between the latch and the flange.

Figure 11:
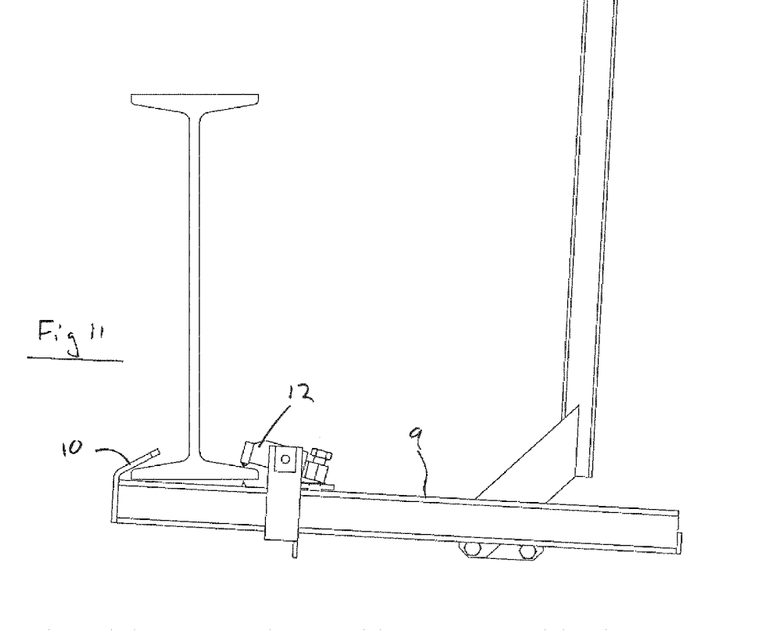
FIG. 11 is a side elevational view of the beam clamp shown in FIG. 9 with the first clamping member engaged with one side of the bottom flange of the beam and the second clamping member partially engaged with the opposite side of the lower flange of the beam and the latch in a partially engaged configuration.

Once again, with specific reference to the embodiment of the invention shown in the FIGS. 1 through 5, first clamping member 10 may be fixed to base 9 and second clamping member 11 slidably mounted to the base. In this instance, first clamping member 10 is comprised of an angled steel or metallic plate that can effectively be hooked over one edge of lower flange 6, thereby permitting second clamping member 11 to be slid toward the flange until the latch mechanism comes into contact with, or is in close proximity to, the upper surface of the flange opposite to that which first clamp member 10 engages (see FIGS. 11 and 12). At that point bolt 16 is tightened in order to drive pins 18 into contact with the upper surface of the flange and to secure latch 12 in its engaged position. Once bold 16 is tightened the beam clamp will be rigidly secured to beam 3 (see FIGS. 13 and 14).

As mentioned previously, in the embodiment shown in the attached drawings, base 9 includes a post 2 which can be used to support a barrier fence 1 (of for that matter that can also be utilized for a very wide variety of other uses or applications). In one embodiment post 2 is slidably received upon base 9 so that it can be moved either toward or away from beam 3 as necessary for any particular application. As also mentioned, in one embodiment base 9 is comprised of three generally parallel longitudinal rails. In that embodiment post 2 is slidably received about middle rail 19. Rear plate 23 of second clamping member 11 is positioned immediately above longitudinal rail 19. Loading post 2 in a direction generally parallel to base 9 and away from beam 3 (such as would be the case if a worker were to slip off the upper flange of the beam and fall against the barrier fence 1 shown in FIG. 1) will cause a torque to be applied by post 2 to longitudinal rail 19. It will thus be understood that the torque applied to longitudinal rail 19 will tend to deflect the inner portion 20 of longitudinal rail 19 in an upward direction, thereby transferring force to plate 23 and bolt 16, which will have the effect of further urging latch 12 toward its engaged position. That is, in the case of a situation where a worker slips and falls against barrier fence 1, the structure of beam clamp 4 is such that the force applied to the latch to maintain the beam clamp in place will be enhanced or increased.

In the embodiment of the invention shown in the attached drawings, beam clamp 4 further includes a visual indicator to provide a visual sign or signal that can be used to communicate to a worker that there has been a secure connection of the clamping member (in this instance second clamping member 11) to the flange of beam 3. With current systems that are in use workers are forced to trust that clamps, barriers or other safety devices have been properly installed and that they have not become loose or been jarred out of position such that they no longer present the level of safety that is expected and that may be demanded of them. In accordance with the present invention, a visual indicator is employed that allows a worker to easily inspect the beam clamp to determine whether or not it has been safely and securely installed about the beam through merely glancing at clamping member 2 and looking for, in this instance, the presence of a colored flag.

Figure 10:
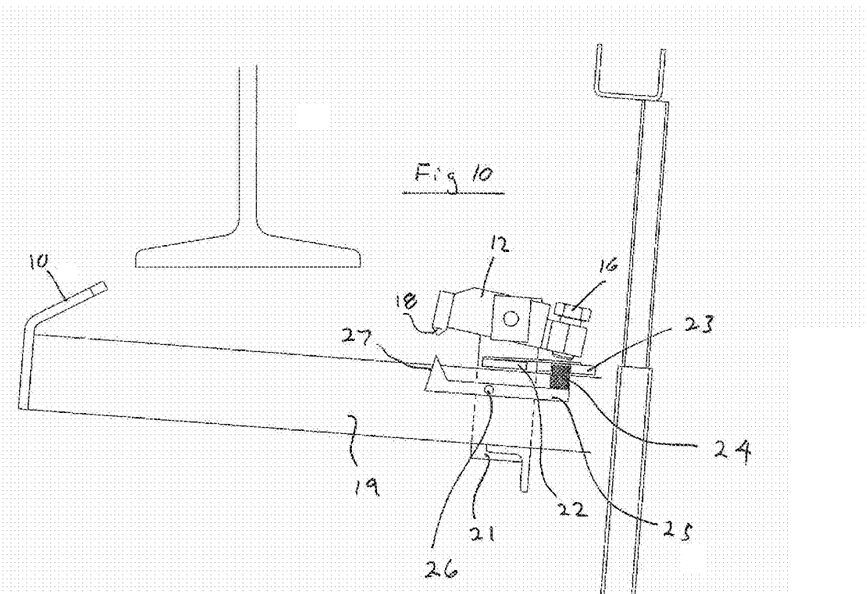
FIG. 10 is an enlarged detailed view of the beam clamp shown in FIG. 9 in vertical section through the latch.
Figure 12:
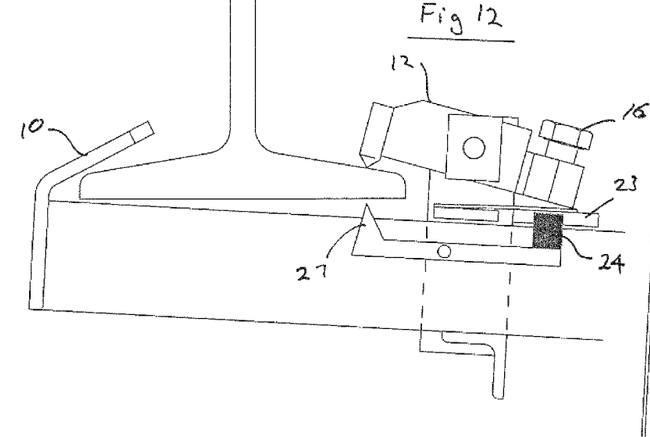
FIG. 12 is an enlarged detailed view of the beam clamp shown in FIG. 11 in vertical section through the latch.
Figure 13:
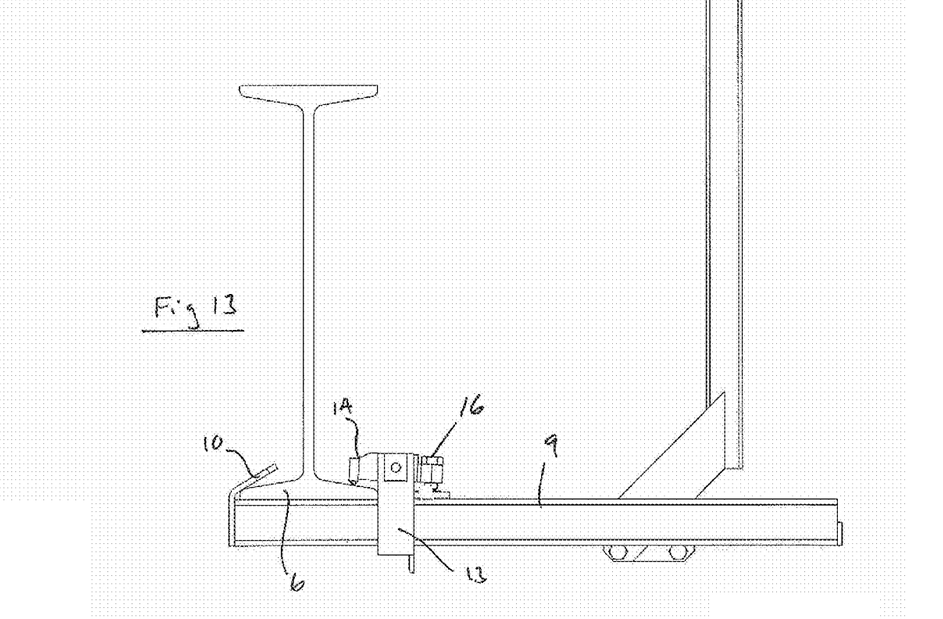
FIG. 13 is a side elevational view of the beam clamp shown in FIG. 11 wherein the second clamping element is fully secured to the flange of the beam and the latch is in its engaged position.
Figure 14:
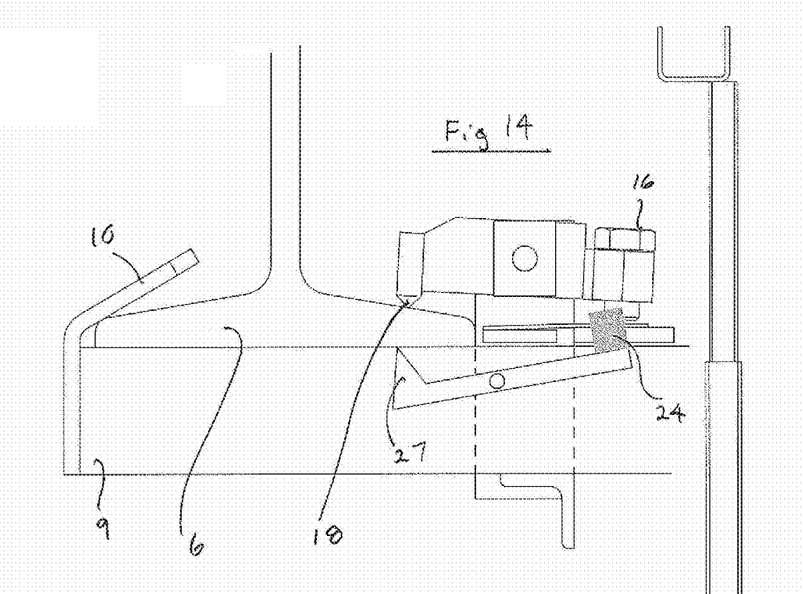
FIG. 14 is an enlarged detailed view of the beam clamp shown in FIG. 13 in vertical section through the latch.

As shown in the attached drawings, the visual indicator is comprised of a flag 24 which will be painted a green color since green is generally accepted as a universal color for "go" or "safety". With reference to FIGS. 10, 12 and 14, flag 24 is mounted on one end of a pivot arm 25 that is rotationally received about a pivot pin 26 on second clamping member 11. The opposite end of pivot arm 25 is fitted with an actuator 27 that, in the embodiment shown, comprises an upwardly extending member that contacts the lower surface of lower flange 6 when the beam clamp is brought into contact with the flange.

As shown in FIG. 10, when latch 12 is in its disengaged position flag 24 is retracted into base 9 so that it is not readily visible. In this instance the flag is received within an open longitudinal channel between the rails that form base 9. FIG. 12 shows beam clamp 4 partially engaged with lower flange 6, where first clamping member 10 is received about one edge of the lower flange and second clamping member 11 is in place adjacent to the opposite edge of the flange such that latch 12 is in a partially engaged position. As the latch becomes fully engaged it will effectively draw the upper surface of base 9 into contact with the lower surface of flange 6 which, in turn, will cause actuator 27 to contact the lower surface of the flange thereby resulting in a rotation of pivot arm 25 (in this instance counter clockwise) to the point where flag 24 raises above the upper surface of the base and becomes visually identifiable. Hence it will be appreciated that once latch 12 is fully engaged and beam clamp 4 is secured to the beam, flag 24 will be visible signifying to a worker that there is a secured connection between second clamping member 11 and the beam. Should for any reason latch 12 become disengaged, the upper surface of base 9 will be retracted from the lower surface of flange 6, resulting in flag 24 dropping down into base 9 and becoming obscured from view.

It will further be appreciated by those reasonably skilled in the art that while one particular embodiment of a visual indicator has been described and shown in the attached drawings, there are a variety of other mechanical mechanisms that could be utilized to visually signify to a worker that a secure connection has been made between the beam clamp and the bottom or lower flange of the beam. In addition, while in the present invention the relative weight of flag 24 compared to that of actuator 27 (and the length of the pivot arm between the flag and pin and between the actuator and the pin) is relied upon to ensure that the flag remains in an obscured position when latch 12 is disengaged, in other embodiments a spring of other biasing means could be used.

It will thus be appreciated that the beam clamp described and shown herein provides a simple and fast mechanism to releasably secure a structure or base member to a beam. The beam clamp can be attached to the beam by a single worker in a safe and efficient manner, and with minimal effort. The clamp is also easily adaptable to beams of various sizes and provides a structure where the loading of its base through a force applied to a post mounted thereon tends to enhance the force by which the clamp is secured to the beam. The clamp and its related structures are configured in a manner that permits the clamp to be used on a wide variety of different sizes of beams and that also permits the clamp to be easily removed and re-used at other locations. A visual indicator signals to users that the clamp is positioned safely and securely on the beam.

It is to be understood that what has been described are various embodiments of the invention and that it may be possible to make variations to these embodiments while staying within the broad scope of the invention. Some of these variations have been discussed while others will be readily apparent to those skilled in the art. For example, while the application of the invention has been described as it relates to common steel beams (in this instance I-beams), it will be appreciated that the invention could equally be utilized on aluminum beams, concrete beams, wooden beams or various other types of beams, angles, flanges, plates, columns or other similar or related non-beam type structures.

Having thus described the invention, it is now claimed:

1. A beam clamp releasably securable to a flange of a beam, the beam clamp comprising:
    a clamping member connected to a base, the clamping member including a latch, the latch having an engaged and a disengaged position, when in the engaged position the latch securing the clamping member to the flange and thereby securing the base to the beam, when in the disengaged position the latch permitting the base to be removed or withdrawn from the beam;
    wherein the latch includes a lock to retain the latch in the engaged position; and,
    wherein the lock comprises a bolt that bears against the base such that tightening the bolt urges the latch towards the engaged position.

2. The beam clamp as claimed in claim 1 wherein:
    the beam comprises a web;
    the clamping member comprises a first clamping member;
    the beam clamp further comprises a second clamping member; and,
    the first and the second clamping members releasably engagable with the flange of the beam on opposite sides of the web.

3. The beam clamp as claimed in claim 2 wherein at least one of the first and the second clamping members are slidably received upon the base to allow the beam clamp to accommodate flanges of varying sizes.

4. The beam clamp as claimed in claim 1 wherein the latch is pivotally mounted to the second clamping member.

5. The beam clamp as claimed in claim 1 including a visual indicator, the visual indicator providing a visual signal signifying a secure connection of the clamping member to the beam.

6. The beam clamp as claimed in claim 5 wherein the visual indicator is pivotally mounted to the clamping member such that it is obscured from view when the latch is in the disengaged position and it is visible when the latch is in the engaged position.

7. A beam clamp releasably securable to a flange of a beam having a web, the beam clamp comprising:
    a first clamping member releasably securable to a first side of the flange;
    a second clamping member releasably securable to a second side of the flange, the first and second sides of the flange being on opposite sides of the web;
    a base connecting the first and second clamping members, when the first and the second clamping members are secured to the flange the base is secured to the beam;
    at least one of the first and the second clamping members including a latch pivotally mounted thereto, the latch having an engaged and a disengaged position, when in the engaged position the latch is in frictional contact with, and securing the clamping member associated therewith, to one side of the flange of the beam;

wherein the latch includes a lock to retain the latch in the engaged position; and, wherein the lock comprises a bolt that bears against the base such that tightening the bolt urges the latch towards the engaged position.

8. A beam clamp as claimed in claim 7 including a visual indicator, the visual indicator providing a visual signal signifying the securement of the second clamping member to the flange.

9. The beam clamp as claimed in claim 8 wherein the visual indicator is pivotally mounted to the second clamping member such that it is obscured from view when the latch is in the disengaged position and it is visible when the latch is in the engaged position.

10. The beam clamp as claimed in claim 7 wherein the latch includes a biasing member for urging the latch toward the engaged position.

11. The beam clamp as claimed in claim 7 wherein the latch includes one or more pins, the pins contacting the surface of the flange of the beam when the latch is in the engaged position, the one or more pins enhancing the frictional and mechanical contact between the latch and the flange.

12. The beam clamp as claimed in claim 7 wherein at least one of the first and the second clamping members are slidably mounted to the base permitting the beam clamp to be releasably secured about beams having flanges of varying widths.

13. The beam clamp as claimed in claim 7 wherein the first clamping member is fixed to the base and the second clamping member is slidably mounted to the base.

14. The beam clamp as claimed in claim 7 wherein the base includes a post mounted thereon, the post engaging a longitudinal rail on the base, the longitudinal rail having a portion generally beneath the bolt, loading the post in a direction generally parallel to the base and outwardly from the latch causing the application of a force to the longitudinal rail having the tendency to deflect the portion of the longitudinal rail beneath the bolt in a direction toward the bolt, the deflection of the longitudinal rail further urging the latch toward the engaged position.

15. The beam clamp as claimed in claim 14 including a visual indicator providing a visual signal signifying the securement of the second clamping member to the flange.

* * * * *